Aug. 6, 1940.  S. P. LEVENBERG  2,210,211
ELECTRICAL TIMED IMPULSE CIRCUIT
Filed Sept. 2, 1939
*Fig. 1*
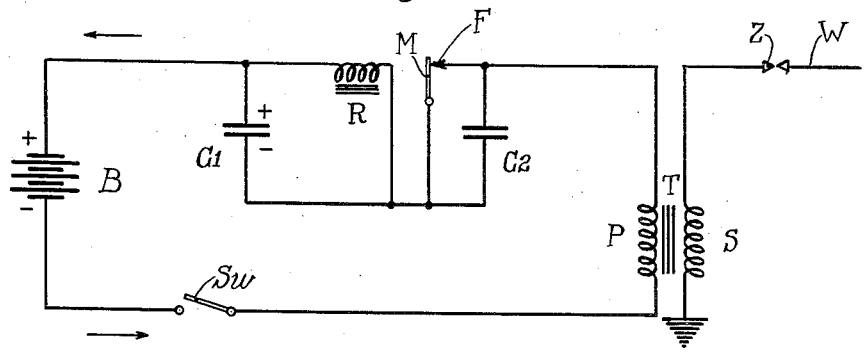
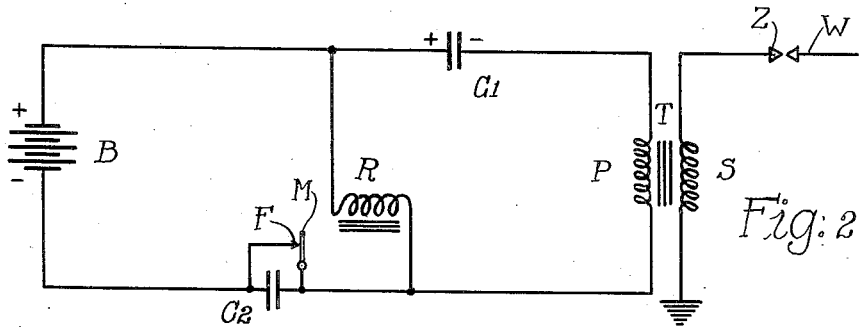
*Fig. 2*
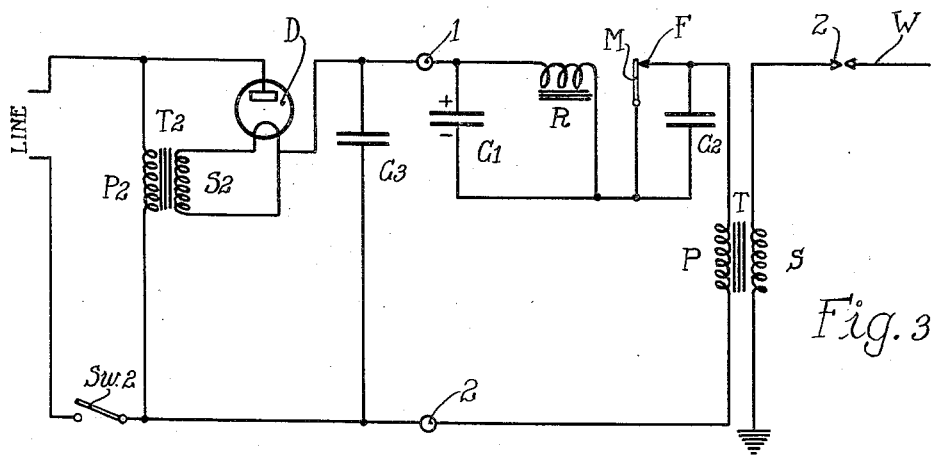
*Fig. 3*
INVENTOR.
Samuel P. Levenberg
BY Wilkinson, Huxley, Byron & Knight
ATTORNEY.

Patented Aug. 6, 1940

2,210,211

UNITED STATES PATENT OFFICE 2,210,211

ELECTRICAL TIMED IMPULSE CIRCUIT

Samuel P. Levenberg, Chicago, Ill.

Application September 2, 1939, Serial No. 293,236

7 Claims. (Cl. 175—365)

This invention relates to a new and improved timed impulse circuit and more particularly to an electric circuit for obtaining timed impulses of higher voltage from a comparatively low voltage source of current.

My invention is particularly applicable for use in connection with electric fence controls, although it may obviously be used in other applications where a circuit of this character is desired. Fence control circuits are designed to give a slight shock of sufficient intensity to domestic animals so that the animals will keep away from the wire or wires which constitute the fence. It is essential, however, that the power source be incapable of administering a shock which can injure animals or injure persons who may come in contact with the fence. A number of States have enacted laws limiting the character and amount of current applied to such fences and require that the current be held to a few milliamperes and that it be an interrupted or pulsating current.

Since the usual source of current supply for such fences consists of primary batteries or storage batteries which deliver direct current at low voltages, it is necessary to provide means for interrupting the current flowing from the source through a step-up transformer in order that the transformer may function. Early fence controls used for this purpose an ordinary type of vibrator, but such constructions have the serious defect that they require a substantially constant flow of current and constitute a heavy drain upon the batteries. It is essential for a commercially practicable fence control that the battery drain be very low in order to keep the maintenance expense of the fence within reasonable limits.

It is an object of the present invention to provide a new and improved timed impulse circuit. It is a further object to provide a circuit of this character which is simple in design and construction and which requires a minimum number of parts.

It is also an object to provide a circuit in which the timing elements are connected directly in the primary circuit and in which additional circuits and relays are not required.

It is an additional object to provide a circuit including a high capacity condenser and a single relay as time control elements.

Other and further objects will appear as the description proceeds.

I have shown diagrammatically in the accompanying drawing certain circuit arrangements suitable for carrying out my invention. In the drawing—

Figure 1 is a diagram of a circuit utilizing a low voltage direct current as the source of power;

Figure 2 is a modified circuit similar to Figure 1 but with certain circuit elements transposed; and Figure 3 is a circuit generally similar to that of Figure 1 but utilizing a higher voltage alternating current as the source of power.

Referring first to the circuit of Figure 1, the source of power is the battery B which may be a primary or secondary battery. The positive side of the battery is connected to the condenser C' and to the coil of the relay R. The condenser C' is of the electrolytic type with a high capacity, preferably on the order of from 30,000 to 50,000 microfarads. The relay coil preferably has a resistance of approximately thirty ohms. The negative side of the condenser and the opposite end of the relay coil are connected together and to the movable contact M of the relay. The fixed contact F of the relay is connected to the primary P of the step-up transformer T, the opposite side of the primary being connected through switch Sw to the negative side of the battery B. The primary P of the transformer has a low direct current resistance, preferably of the order of one-tenth of an ohm. The fixed condenser C2, which may have a capacity of approximately .25 to .5 microfarad, is connected across the relay contacts to reduce sparking at the contacts and to by-pass reverse peak voltages produced by the transformer primary.

The output circuit from the apparatus comprises the secondary S of the transformer T, one side of which is grounded and the other side connected to a spark gap Z. This spark gap may be spaced to permit suitable voltages, such as voltages above 1500 volts, to pass over and energize the fence wire W.

The circuit of Figure 2 comprises the same components as that of Figure 1, with certain elements transposed. The electrolytic condenser C1 and the transformer T are in series with each other and are jointly connected in parallel to the relay coil R. Due to the very low resistance of the transformer primary in relation to the resistance of the relay coil, this circuit functions in substantially the same manner as that of Figure 1.

The circuit shown in Figure 3 is similar to that of Figure 1, the difference being that instead of the battery B as a source of power, the apparatus is connected to a rectifier circuit fed from an alternating current line of usual voltages of 110 or 115 volts. The line is connected through switch Sw2 to the primary P2 of the rectifier transformer T2. The rectifier tube D is shown as a half wave rectifier of the filament type, the filament being connected to the secondary S2 of the transformer T2. One side of the line circuit is connected to the plate of the rectifier. The filament of the rectifier is connected to the input terminal 1 of the timed impulse circuit, this being the positive side of the rectifier output. The other side of the line constitutes the negative side of the rectifier circuit and is connected to the negative terminal 2 of the timed impulse circuit. A filter condenser C3 of approximately twenty microfarads capacity is connected across the rectifier output.

The condenser or electrolytic cell C1 is of such a type that it has substantially no oxide formation on its electrodes or has a minimum of such formation. This is essential in maintaining its polarization capacity from zero to 150° F. This is for the reason that the capacity where oxide deposition electrodes are used varies greatly with variation of temperatures within the above range. The contact M of the relay is preferably fastened on a flexible spring member attached to the armature of the relay. This spring mounting of the contact causes a slight oscillating contact breaker action with several makes and breaks on each movement which causes current lags in the primary and helps to better saturate the primary of the transformer.

The operation of the timed impulse circuit of Figures 1, 2 and 3 is the same, the only difference between Figures 1 and 2 and Figure 3 being the source of the direct current which serves as the power for the impulse circuit.

The operation will be described in connection with the circuit of Figure 1. With the switch Sw closed, current from the battery B flows through the electrolytic condenser C1, through the relay contacts M and F, and through the secondary P of transformer T back to the battery B. This flow takes place in spite of the fact that the coil of the relay R is connected in parallel with the condenser C1, for the reason that this high capacity electrolytic condenser has a direct current resistance very much less than the thirty ohms resistance of the relay coil R, before the condenser C1 is charged. The transformer primary P saturates very quickly since it has a direct current resistance of a small fraction of an ohm. A high voltage pulsation is set up in the transformer secondary S and jumps the gap Z to momentarily energize the wire W. It will be understood that the gap Z is of such dimensions that it acts to prevent current of 115 volts, such as is used as a source of power in the circuit of Figure 3, from jumping across to the wire W. This is highly important as a safety device to prevent any possibility of the fence being charged with a line current in the event of break down or accidental shorting of parts in the apparatus.

Despite its very high capacity, the condenser C1 charges very rapidly through the low resistance of the transformer primary P and as it charges, its resistance increases so that it is almost instantaneously raised to such an amount that a substantial amount of current flows through the relay coil R which is in parallel to the condenser. When the relay coil is energized it draws to it the movable contact M of the relay, thus breaking the main circuit. The stored current in the condenser C1 now discharges through the relay coil R, maintaining the relay energized for an appreciable period. When the current flowing is no longer adequate to energize the relay, the movable contact M falls away from the relay coil and engages the fixed contact to again complete the primary circuit. The cycle of operations then repeats as long as switch Sw is closed.

With components of the order of resistance and capacity which have been stated, the battery or power circuit is open a very substantial portion of the time so that the power drain is relatively low. It will be understood that transposition of the component parts in this circuit, such, for example, as the transposition shown in Figure 2, does not affect the functioning of the circuit. Variations in the capacity of the electrolytic cell or condenser, in the resistance of the relay coil and in the resistance and turns of the transformer windings, will vary the timing calibration and output of electrical impulses.

The time delay action is substantially independent of fluctuations of input voltages. This is for the reason that when the input voltage is low the relay armature, having a lessened magnetic pull, is tardy in breaking the contacts, therefore storing up electricity in the condenser C1 at a lower voltage for a longer period. On the other hand, when the input voltage is greater the magnetic pull on the armature is faster, storing up practically the same amount of electricity at a higher voltage in the electrolytic cell or condenser C1 in a shorter period of time. The armature is released in both cases with about the same delay action. The condenser C1 acts as a polarized cell of very high capacity with a polarization voltage of approximately three-fourths of a volt. When this voltage fades out the cell then acts as a capacitor.

My improved circuit is simple and inexpensive to make as it comprises but few parts. While other types of relays may be used, only a single relay of the single pole, single throw type is necessary, and the time interval means are directly incorporated in the primary circuit. It is simple to maintain and operates at a low drain upon the source of power.

While I have shown certain preferred embodiments of my invention by way of example, it is capable of change and variation to meet differing conditions and requirements and I contemplate such modifications as come within the spirit and scope of the appended claims.

I claim:

1. An electrical timed impulse circuit comprising a source of power, a condenser, a relay, and a load, the condenser and relay coil being in parallel and the relay contacts being in series with the coil and condenser and with the load, the relay contacts being normally closed to complete the circuit.

2. An electrical timed impulse circuit comprising a source of power, a condenser, a relay, and a load, the condenser and relay coil being in parallel and the relay contacts being in series with the coil and condenser and with the load, the relay contacts being normally closed to complete the circuit, the direct current resistance of the relay coil being substantially greater than the resistance of the condenser when the latter is in uncharged condition.

3. An electrical timed impulse circuit comprising a source of power, an electrolytic cell, a relay, and a load, the electrolytic cell and relay coil being in parallel and the relay contacts being in series with the coil and cell and with the load, the relay contacts being normally closed to complete the circuit, the relay coil having a substantially greater direct current resistance than the load.

4. An electrical timed impulse circuit comprising a source of power, a condenser, a relay, and a load, the condenser and relay coil being in parallel and the relay contacts being in series with the coil and condenser and with the load, the relay contacts being normally closed to complete the circuit, the direct current resistance of the relay coil being substantially greater than the resistance of the condenser when the latter is in uncharged condition, and also substantially greater than that of the load.

5. An electrical timed impulse circuit comprising a source of direct current, a high capacity electrolytic condenser, a relay and a load, the load comprising a transformer primary, the relay having a single coil in parallel with the condenser and the relay contacts being in series with the coil and condenser and with the load, the relay contacts being normally closed to complete the circuit.

6. An electrical timed impulse circuit comprising a source of direct current, a high capacity electrolytic condenser, a relay and a load, the load comprising a transformer primary, the relay having a single coil in parallel with the condenser and the relay contacts being in series with the coil and condenser and with the load, the relay contacts being normally closed to complete the circuit, the direct current resistance of the condenser being substantially less than that of the relay coil when the condenser is in uncharged condition, the direct current resistance of the transformer primary also being substantially less than that of the relay coil.

7. An electrical timed impulse circuit comprising a source of power, a high capacity electrolytic condenser, a relay and a load, the load having substantially less direct current resistance than the relay coil, the condenser being connected in parallel to the relay coil and the load being connected in series with the relay coil, and the relay contacts and source of power also being connected in series with the relay coil, the relay contacts being normally closed to complete the circuit.

SAMUEL P. LEVENBERG.